Sept. 28, 1937.  W. P. ZIMMERMAN ET AL  2,094,287
METHOD OF MANUFACTURING MULTIPART GLASS ARTICLES
Original Filed May 13, 1935   2 Sheets-Sheet 1
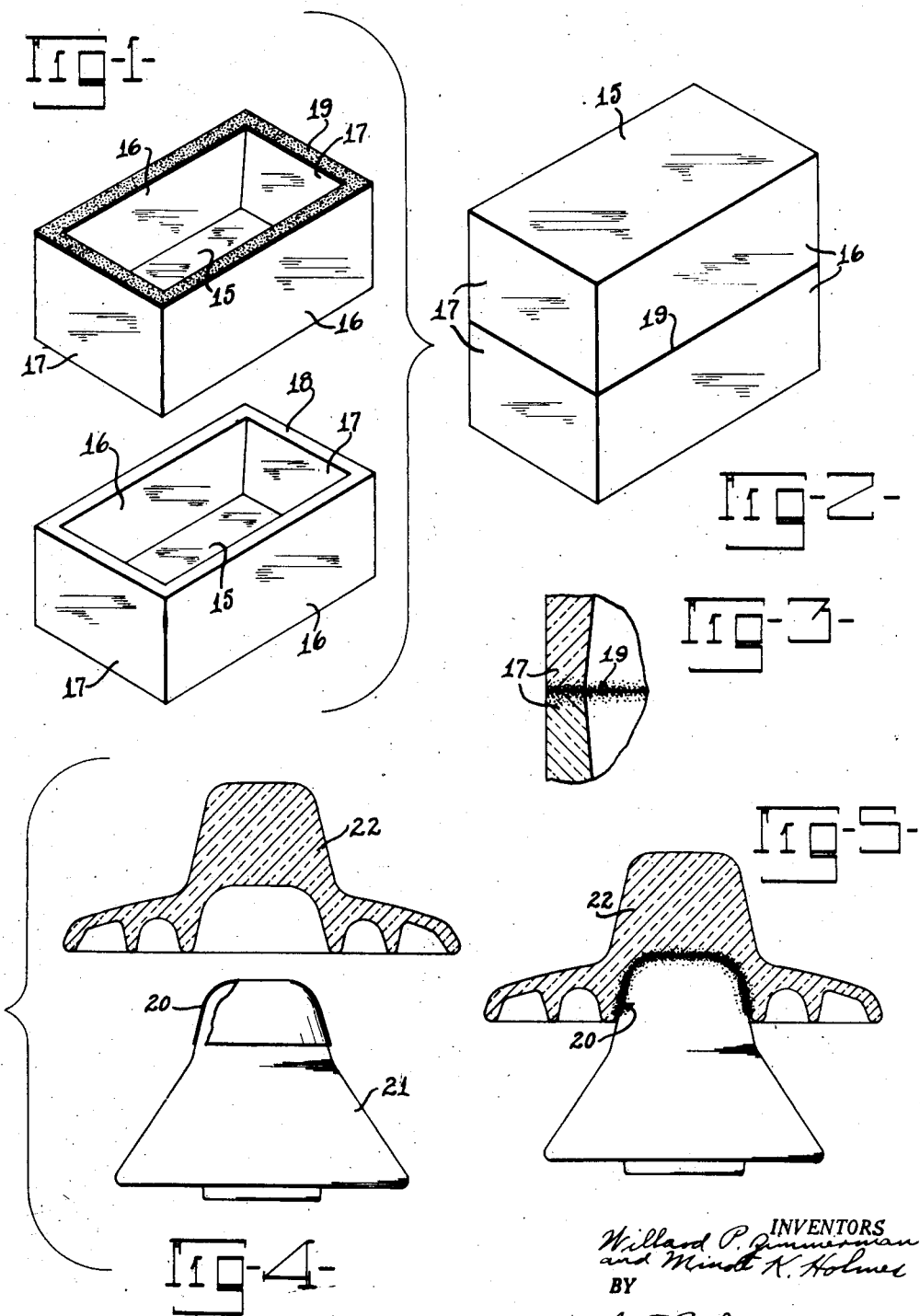

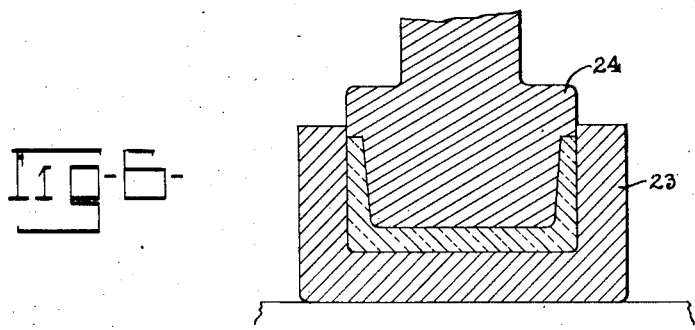
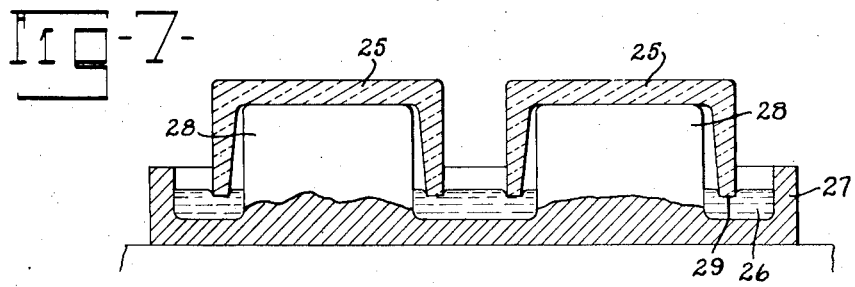
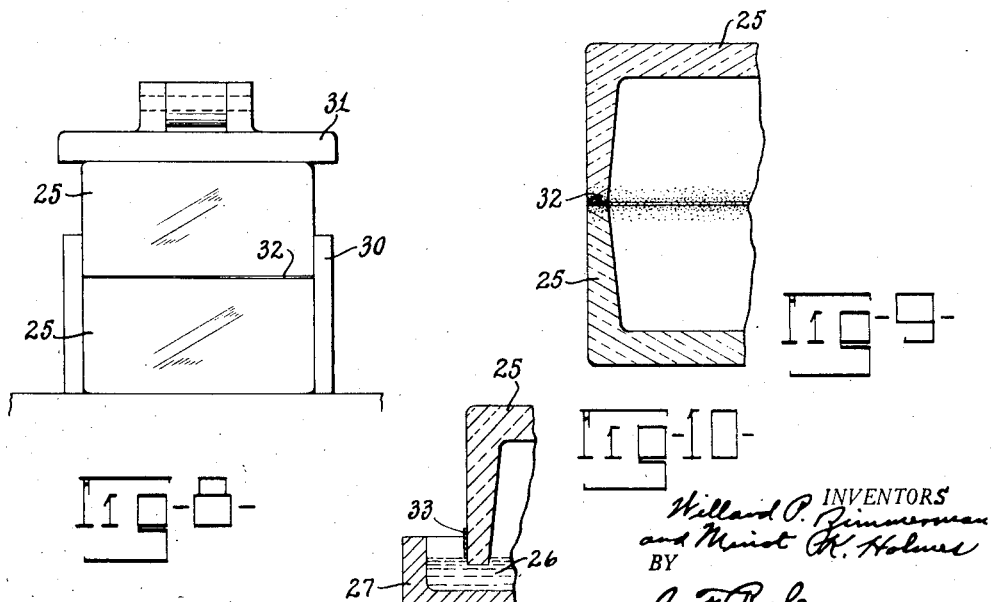

Patented Sept. 28, 1937

2,094,287

UNITED STATES PATENT OFFICE 2,094,287

METHOD OF MANUFACTURING MULTI-PART GLASS ARTICLES

Willard P. Zimmerman and Minot K. Holmes, Muncie, Ind., assignors to Owens-Illinois Glass Company, a corporation of Ohio Application May 13, 1935, Serial No. 21,095
Renewed April 27, 1937

10 Claims. (Cl. 49—81)

The present invention relates to improvements in multipart glass articles and methods of manufacturing the same and more particularly to building blocks or bricks and electrical insulators in which the finished article represents an assembly of two or more parts.

An object of the present invention is the provision of novel and effective means for uniting glass parts in a fashion capable of commercial adaptation.

Another object of the present invention is to unite glass parts by means of an inorganic bonding medium in such a fashion that the bond at least to a considerable degree, is absorbed by and in effect constitutes a part of the glass structure in the finished article. To this end the bonding medium preferably assumes the form of a metal possessing amphoteric properties acting either as a base or as an acid in chemical reaction with other materials.

A further object is the provision of means for effecting a combined chemical and mechanical bond between the glass parts of a character to successfully withstand extreme weather conditions and the like.

A still further object is the provision of a novel method of applying the bonding medium to the glass parts whereby to facilitate comparatively high speed production.

Other objects will be in part apparent and in part pointed out hereinafter.

In the drawings:

Fig. 1 illustrates in perspective two half brick sections prior to assembly.

Fig. 2 shows the sections assembled to form a complete brick or building block.

Fig. 3 is a fragmentary sectional view intended to illustrate the manner in which a portion of the bonding material is absorbed by the glass.

Fig. 4 is a view showing two insulator sections or parts prior to assembly.

Fig. 5 is a view showing the two insulator parts united by means of a film of metal bonding material.

Figs. 6, 7, and 8 illustrate certain of the steps involved in the method. Fig. 6 shows one of the glass brick sections being molded. Fig. 7 is a view showing two brick sections with the edges to be united, dipped into a bath of molten metal bonding material. Fig. 8 shows the two sections arranged one upon the other and held in alignment under pressure during setting of the bonding medium.

Fig. 9 is a fragmentary sectional view showing the two brick sections united.

Fig. 10 is a fragmentary sectional view showing a portion of a glass brick section dipped into a molten metal bonding material, certain surface portions of the brick being coated to prevent permanent adhesion of the bonding material thereto.

While we herein frequently refer to "glass", we wish it to be understood that the invention while particularly applicable to glass, is in no manner limited thereto and the term "glass" is intended to include all other vitreous materials to which the invention may be applied.

In more or less general terms the present invention provides for uniting glass parts immediately following the initial formation of the parts and prior to the customary annealing operation while they are quite hot (substantially above 1000° F.), the means for uniting the parts assuming the form of a metal possessing amphoteric properties as stated heretofore. We have found aluminium to provide the most satisfactory results, although other metals such as copper, have created a more or less satisfactory bond. The metal may be applied to the edges intended to be united, either in the form of a thin sheet of foil or by dipping these edges into a pool or bath of molten aluminium.

In Figs. 1, 2, and 3, we have illustrated the manner in which aluminium foil or sheet aluminium may be employed in uniting the sections of a glass brick or building block. The brick consists of two pressed glass sections, each including a bottom wall 15 and side and end walls 16 and 17 respectively, the latter providing a continuous flat sealing surface 18 or edge. Immediately after these sections are removed from the forming mold and while quite hot (substantially above 1000° F.), a strip of aluminium foil 19 is placed upon the sealing surface 18 or edge of one of the sections. As quickly as possible, the other section is inverted and placed in proper position on the foil carrying section. Top pressure is applied thereto and continued during fusion of the bonding material and initial setting or solidification thereof. Thereafter, the completed brick or building block is placed in an annealing leer, wherein the glass is cooled uniformly in a fashion to prevent setting up objectionable strains and stresses in the structure. Incidentally this foil should be not more than three or four thousandths of an inch in thickness to give the best results.

It has been found that while pure aluminium foil effects a very satisfactory bond, the use of boric acid and borax in conjunction therewith increases its effectiveness in that it very evidently causes a more complete absorption of the bonding material by the glass by fluxing the surface of the glass and attacking the aluminium. In using boric acid and borax with the aluminium foil, it may be mixed in proper proportions with water and brushed or otherwise similarly applied to the surface of the foil, or it may be applied thereto by vaporization of the fumes thereon. Other materials such for example as lead borate and carbonate, stannic chloride, copper sulphate and iron oxide have been employed in lieu of boric acid and borax and proved to be more or less satisfactory.

In Fig. 3 we have attempted to illustrate the manner in which the aluminium is fused and absorbed to some extent by the glass in proximity to the sealing surface 18. The connection between the brick sections is for the greater part, a chemical bond arising in part at least from the chemical reaction and combination between free alkali in the glass and the aluminium which has been applied to the sealing surface of the sections.

In Figs. 4 and 5 we have illustrated the manner in which aluminium foil or the like metal may be employed in assembling multi-part insulators. The aluminium bonding material 20 is applied to one part 21 of the insulator and thereafter the other part 22 is placed in position on the first part under pressure in substantially the same manner as in the assembly of the brick sections. It is understood of course that the two insulator parts are quite hot, being at substantially above 1000° F.

In Figs. 6 to 9 inclusive, we have illustrated what we have proved to be a highly satisfactory and commercially practicable method of assembling brick sections. The brick sections are formed in a mold 23 into which a measured quantity of molten glass is placed and pressed to its final shape by a plunger 24. Two of these brick sections 25 are then placed over a bath of molten pure aluminium 26 or aluminium silicon alloy in a container 27. The temperature of this bath may be approximately 1350° F. to 1400° F. The brick sections are supported against sagging by means of blocks 28 which are of such height that they allow only the sealing surfaces 29 or edges and very small portions of the adjacent side surfaces to project into the bath of molten metal. After these surfaces have remained in the bath a sufficient period of time to become reheated to approximately the temperature of the metal and effect adhesion of some of the metal to these sealing surfaces, the sections are removed and placed one upon the other in a form 30 and under a presser bar 31. After these sections have been united under pressure and the bonding material 32 has set or solidified to the necessary degree, the completed article is placed in an annealing leer (not shown) wherein it is gradually cooled to atmospheric temperature.

With reference to the molten bonding material, it may be explained that while pure aluminium melts at approximately 1220° F., it is heated to approximately 1350° to 1400° F. for the purposes of the present invention and in order to quickly raise the glass temperature to the degree at which it will absorb and form a permanent union with the aluminium. In order to extend the period of setting or solidification of the bonding material, which is quite rapid in the case of pure aluminium, silicon has been added. With the addition of approximately seven to twelve percent silicon the resultant alloy melts at approximately 1070° as against 1220° F. for pure aluminium and provides for extension of the time of setting essential to satisfactory performance of the assembly operation.

By means of an implement such for example as a properly heated soldering iron, excess bonding material may be removed from the side surfaces of an assembled brick or block and at the same time any voids in the material may be filled in and closed.

In order to prevent permanent adhesion of the molten aluminium to surfaces of the brick sections in proximity to those intended to be united, a coating of rubber may be applied to the glass just above the sealing surfaces prior to dipping the sections into the bath of molten metal. This coating of rubber burns off rapidly and leaves an alkaline deposit on the surface which the aluminium or other metal does not "wet" very readily. The term "wet" has reference to the extent to which the metal tends to spread out and create a continuous unbroken film over a surface to which it is applied. In this connection it has been found that molten pure aluminium or aluminium silicon alloy "wets" extremely hot glass quite readily and forms a continuous film which is essential to the creation of a satisfactory bond and hermetic seal between sections of the brick or building block. It will be appreciated also that since the sections are assembled at a temperature higher than 1000° F. a fairly high vacuum will be created therein as the article is cooled to atmospheric temperature. In fact, on an average approximately 18 inches of vacuum will be produced. This is of considerable value in that it reduces very materially, if not eliminates, the condensation of moisture on the interior surfaces of the block.

In view of the above, it will be apparent that we have devised a highly effective means for uniting multi-part glass articles and have conceived a simple and commercially practicable method in which the sealing operation is effected prior to the customary annealing operation and immediately following molding of the parts. Thus the necessity for reheating and a second annealing of the glass is avoided.

Modifications may be resorted to within the spirit and scope of the appended claims.

We claim:

1. The method of producing a hollow glass building block which consists in molding hollow sections having edge portions adapted to be united, dipping said edge portions while hot into a bath of molten aluminium and retaining the edges in the bath a sufficient period of time to substantially equalize the temperatures of said edges and bath and thereby coat the edges with aluminium, bringing said coated edge portions into contact with each other under pressure.

2. The method which consists in molding from molten glass a pair of substantially cup-like sections, dipping the edge portions of these sections while hot into a bath of molten aluminium prior to any annealing of the sections to reheat the edge portions and effect adhesion of some of the aluminium thereto, assembling the sections to unite the aluminium coated edge portions and form a hollow hermetically sealed article and annealing the article.

3. The method which consists in molding from molten glass a pair of substantially cup-like sections, dipping the edge portions of these sections while hot into a bath of molten aluminium silicon alloy prior to any annealing of the sections to reheat the edge portions and effect adhesion of some of the aluminium silicon alloy thereto, assembling the sections to unite the aluminium coated edge portions and form a hollow hermetically sealed article and annealing the article.

4. The method which consists in molding glass parts and prior to any great loss of the heat present in the glass during the molding operation, coating a surface area of at least one of the parts with a bonding medium and bringing the coated surface into contact with the other part under pressure.

5. The method of producing a hollow glass building block which consists in molding hollow sections having edge portions adapted to be united, dipping said edge portions while still hot into a bath of molten metal prior to any annealing of the sections and retaining said edge portions in the bath a sufficient period of time to coat them with the metal and bringing the coated edge portions into contact with each other under pressure.

6. The method of producing a hollow glass building block which consists in molding hollow sections having edge portions adapted to be united, dipping said edge portions while hot into a bath of molten metal and retaining the edges in the bath a sufficient period of time to substantially equalize the temperatures of said edges and bath and thereby coat the edges with metal, and bringing said coated edge portions into contact with each other under pressure.

7. The method of producing a partially vacuumized hollow glass building block which consists in molding hollow sections, metallizing certain surfaces of the said sections while they are still hot, uniting the metallized surfaces prior to any great temperature loss and cooling the block.

8. The method of producing a partially vacuumized hollow glass building block which consists in molding substantially cup-like sections, applying a metallic bonding medium to a surface area of at least one section while said sections are still hot, uniting the sections prior to any great temperature loss with said surface area lying between the sections and cooling the block.

9. The method of producing a hollow glass building block having a subatmospheric internal air pressure which consists in molding from molten glass a pair of substantially cup-like sections having edge portions adapted to be united, metallizing certain of said edge portions while the sections are still hot, uniting the sections under pressure and cooling the completed block.

10. The method of producing a hollow glass building block which consists in molding hollow sections and prior to any great loss of the heat present in the glass during the molding operation, coating a surface area of at least one of the sections with a bonding medium and bringing the coated surface into contact with the other section under pressure.

WILLARD P. ZIMMERMAN.
MINOT K. HOLMES.